(12) United States Patent
Nagata et al.

(10) Patent No.: US 6,312,775 B1
(45) Date of Patent: *Nov. 6, 2001

(54) OPAQUE SILICA GLASS ARTICLE HAVING TRANSPARENT PORTION AND PROCESS FOR PRODUCING SAME

(75) Inventors: Hiroya Nagata, Atsugi; Masayuki Kudo, Machida; Koji Tsukuma, Tsukuba, all of (JP)

(73) Assignees: Tosoh Quartz Corporation, Yamagata; Nippon Silica Glass Co., Ltd., Tokyo, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/173,685

(22) Filed: Oct. 16, 1998

(30) Foreign Application Priority Data

Oct. 16, 1997 (JP) .................................................. 9-283506
Jan. 27, 1998 (JP) .................................................. 10-014248

(51) Int. Cl.$^7$ .................................................. B32B 17/00
(52) U.S. Cl. .................... 428/34.6; 428/312.6; 428/428; 65/17.3; 65/DIG. 8
(58) Field of Search .................. 501/53, 54; 65/17.3, 65/DIG. 8; 428/312.6, 398, 446, 34.6, 428

(56) References Cited

U.S. PATENT DOCUMENTS

| 3,935,119 | * | 1/1976 | Barber et al. | 350/96.1 |
| 4,956,208 | * | 9/1990 | Uchikawa et al. | 428/34.6 |
| 5,585,173 | * | 12/1996 | Kamo et al. | 428/304.4 |
| 5,651,827 | | 7/1997 | Aoyama et al. | . |
| 5,736,206 | * | 4/1998 | Englisch et al. | 428/34.6 |
| 5,972,488 | * | 10/1999 | Nagata et al. | 428/304.4 |

FOREIGN PATENT DOCUMENTS

| 44 40 104 A 1 | 5/1995 | (DE) . |
| 0 816 297 A1 | 3/1997 | (EP) . |
| 1-43164 | 12/1989 | (JP) . |
| 4-65328 | 2/1992 | (JP) . |
| 6-24771 | 2/1994 | (JP) . |
| 7-61827 | 3/1995 | (JP) . |
| 7-300326 | 11/1995 | (JP) . |
| 7-300327 | 11/1995 | (JP) . |
| 7-300341 | 11/1995 | (JP) . |

OTHER PUBLICATIONS

Chemistry of Glasses, A. Paul, p. 54, 1982.*
Patent Abstracts of Japan vol. 016, No. 265 (C–0951), Jun. 16, 1992 & JP 04–065328 A (Nihon Sekiei Garasu KK; Others: 01) Mar. 2, 1992.
Patent Abstracts of Japan vol. 096, No. 008, Aug. 30, 1996 & JP 08 104540 A (Shinetsu Quartz Prod Co Ltd), Apr. 23, 1996.

* cited by examiner

Primary Examiner—James Derrington
(74) Attorney, Agent, or Firm—Sughrue, Mion, Zinn, Macpeak & Seas, PLLC

(57) ABSTRACT

An opaque silica glass article comprising a transparent portion and an opaque portion, wherein the opaque portion has an apparent density of 1.70–2.15 g/cm$^3$ and contains $5 \times 10^4$–$5 \times 10^6$ bubbles per cm$^3$, said bubbles having an averaged diameter of 10–100 μm; and the transparent portion has an apparent density of 2.19–2.21 g/cm$^3$ and the amount of bubbles having a diameter of at least 100 μm in the transparent portion is not more than $1 \times 10^3$ per cm$^3$. The opaque silica glass article is made by a process wherein a mold is charged with a raw material for forming the opaque portion, which is a mixture comprising a silica powder with a small amount of a silicon nitride powder, and a raw material for forming the transparent portion so that the two raw materials are located in the positions corresponding to the opaque and the transparent portions, respectively, of the silica glass article to be produced; and the raw materials are heated in vacuo to be thereby vitrified.

3 Claims, 10 Drawing Sheets

OPAQUE SILICA GLASS ARTICLE HAVING TRANSPARENT PORTION AND PROCESS FOR PRODUCING SAME

BACKGROUND OF THE INVENTION

(1) Field of the Invention

This invention relates to an opaque silica glass article and a process for producing the same. More particularly, it relates to an opaque silica glass article comprising a transparent portion and an opaque portion, and having good heat insulating property and good surface smoothness, and to a process for producing the opaque silica glass article by melt-forming together a raw material for the opaque portion and a raw material for the transparent portion into an article of an arbitrary shape.

(2) Description of the Related Art

An opaque silica glass article has good heat-insulating property, i.e., is capable of cutting-off heat rays transferring as radiant heat. In the case where the silica glass article contains a salient amount of fine bubbles uniformly distributed therein, its heat-insulating performance is superior.

One example of the opaque silica glass article is a flange provided at the base of a furnace tube used as a furnace for heating a silicon wafer, as illustrated in FIG. 1. A heating furnace illustrated in FIG. 1 has heretofore used widely for heating a silicon wafer, which comprises a heating element 1, a furnace tube 2, a boat 4 for supporting silicon wafers 3, an insulating cylinder 5 and a base 6. A flange 9 is provided at the base of the furnace tube 2. The flange 9 is made of opaque silica glass and welded together with the furnace tube 2 by an oxyhydrogen flame. The flange 9 has a function of heat insulation for cutting off heat transferring to the base 6 and a packing 7, which have a poor heat resistance. A desired atmosphere can be kept within the furnace tube 2 by the seal by means of packing 7 between the flange 9 and the base 6. Opaque silica glass is widely used in many fields including the flange of a heating furnace.

The opaque silica glass article is usually made by a method for heating a powdery siliceous raw material to melt and vitrify the raw material. The method for heating the raw material includes, for example, Verneuil's method wherein the raw material is subjected to flame fusion by using an argon-oxygen plasma flame or an oxyhydrogen flame, and a vacuum melting method wherein a vessel is charged with the raw material and the raw material is heated and melted in vacuo.

As the raw material for the opaque silica glass article, natural silica rock or stone, and rock crystal of a low quality level have heretofore been widely used. These raw materials contain a multiplicity of fine bubbles therein, and, when the raw materials are melted for vitrification, the bubbles remain within the glass to yield opaque silica glass articles.

In recent years, LSI is being highly integrated in the field of a semiconductor, and thus a raw material with a high purity of an opaque silica glass article is eagerly desired. A most typical example of the silica glass article is the above-illustrated flange of a furnace tube used in a furnace for heating a silicon wafer. However, natural raw materials used for the production of an opaque silica glass article contain a salient amount of impurities as well as a salient amount of fine bubbles, and the bubbles are very difficult to remove. Namely it is difficult to obtain a raw material with a high purity by purification. On the other hands, a rock crystal with a relatively high purity contains a minor amount of fine bubbles therein in the crystal, and therefore, even when the rock crystal is melted, the degree of opaqueness is not enhanced and the resulting silica glass article is translucent.

To solve the above-mentioned problems of the prior art, many proposals have been made. For example, a process has been proposed wherein an amorphous silica with a high purity which contains reduced amounts of an alkali metal, an alkaline earth metal, iron and aluminum, and a salient amount of fine bubbles, and has a silanol group as a vaporizable ingredient contained uniformly at a specific concentration is subjected to flame fusion (Japanese Unexamined Patent Publication (abbreviated to "JP-A") H6-24711). However, only silica glass articles having a simple shape such as an IC (Integrated circuit)-sealing silica filler and a matrix ingot for silica glass powder can be directly produced, and after-treatments such as after-shaping by lathing are necessary for the production of silica glass articles with a complicated shape such as a flange-form, a ring-shape, column, square pillar or hollow-square pillar. Utilization of the raw material is low in the production of silica glass articles with a complicated shape, and thus, the production cost is inevitably increased.

As another process for producing an opaque silica glass article, a process has been proposed wherein a highly purified crystalline silica powder is heated in an ammonia atmosphere and then the thus-ammoniated silica powder is heated and melted in an inert gas atmosphere to give an opaque silica glass article having an increased number of very fine bubbles, i.e., having a large total cross-sectional area of bubbles per unit volume of the opaque silica glass, and thus exhibiting an enhanced heat insulation (JP-A H7-61827 and JP-A H7-300341). However, this process has problems such that the density of opaque silica glass, and the diameter and amount of bubbles contained therein greatly varies depending upon the particle diameter and particle diameter distribution of raw material powder and the state of raw material powder charged in a vessel for fusion, and thus, the diameter and amount of bubbles in the surface portion and those in the central portion greatly differ from each other, and an opaque silica glass article having bubbles uniformly distributed therein is difficult to produce with good reproducibility.

As still another process for producing an opaque silica glass article, a process has been proposed wherein a finely divided powder of a foaming agent such as carbon or silicon nitride is incorporated in a siliceous raw material such as silica rock or stone, α-quartz or cristobalite, and the mixture is subjected to a flame fusion using an oxyhydrogen flame (JP-A H4-65328). The above-mentioned problems can be solved by this proposed process. However, the use of oxyhydrogen flame invites introduction of a hydroxyl group within silica glass which leads to reduction of the viscosity of molten glass and results in an opaque silica glass article not suitable as articles used for a long period of time at a high temperature, such as a jig for the production of semiconductor devices. Further, in this flame fusion step, the residence time of finely divided particles in the flame is very short, and the completion of reaction in the flame is difficult and it is possible that the foaming agent incorporated remains in the molten material as a foreign matter, and further that the siliceous raw material reacts with the forming gent with the result of undesirable coloration of the molten material.

It is said that, when a silica glass jig for the production of a semiconductor is cleaned after the use thereof, the bubbles exposed on the surface is removed, i.e., the surface is partly scraped down. To solve this problem, a procedure has been adopted for adhering a protective transparent silica glass film of a predetermined shape on the surface by heating with oxyhydrogen flame or in an electric furnace.

For the flange provided at the base of a furnace tube of a heating furnace for a silicon wafer, a heat insulating property as well as a sealing property are required to stably control the atmosphere within the furnace tube. Conventional opaque silica glass flanges have a rough surface due to the presence of bubbles and thus, even where a packing is used, a complete seal cannot be attained. For overcoming this defect, a flange having an opaque portion with good heat insulating property and a transparent portion and with good sealing property is suitable.

Several processes have been proposed for producing the flange having an opaque portion with good heat insulating property and a transparent portion with good sealing property is suitable. As examples of such processes, there can be mentioned (1) a process for fusion-bonding a transparent silica glass article to an opaque silica glass article, (2) a process wherein a powdery raw material for an opaque silica glass is added to a transparent silica glass article and the combination thereof is fusion-bonded, (3) a process wherein a powdery raw material for an opaque silica glass and a powdery raw material for a transparent silica glass are melted, and (4) a process wherein a surface portion of an opaque silica glass article containing bubbles therein is melted whereby bubbles within the surface portion is removed and thus the surface portion is rendered transparent.

The above-recited processes have the following problems. Namely, in the process of (1), at the step of fusion-bonding, bubbles are liable to occur at the interfacial boundary between the transparent silica glass portion and the opaque silica glass portion thereof. In general the adhesion between the transparent portion and the opaque portion thereof is not sufficient and the adhered transparent portion and opaque portion are liable to be separated. Further when the shape of the opaque silica glass article is complicated, the transparent silica glass becomes very difficult to fabricate and to fusion-bond to the opaque silica glass.

In the process of (2), bubbles do not readily occur at the interfacial boundary between the two silica glass portions, but the powdery raw material for the opaque silica glass portion shrinks in the course from the fusion bonding step to the completion of vitrification, and thus the resulting silica glass article is liable to warp. More specifically, JP-A H7-300326 discloses a process wherein a transparent silica glass article is placed in a heat-resistant mold, a powdery raw material for forming opaque silica glass is superposed upon the transparent silica glass article, and then the combined material is subjected to fusion bonding in an inert gas atmosphere to give a silica glass article having an opaque silica glass layer and a transparent silica glass layer. In this process, when the superposed powdery raw material containing an inert gas amoung the particles is melted and vitrified, the inert gas contained among the particles is entrapped within the molten material and becomes bubbles in the resulting glass article. However, the amount of gas derived from the raw material, the number and diameter of bubbles occasionally vary and the bubbles are difficult to uniformly distribute within the glass, and sometimes an inert gas introduced at the step of fusion bonding becomes part of the bubbles within the glass. Therefore, the bubbles within the opaque portion of the silica glass article are difficult to control.

In the process of (3), the gas contained in the powdery raw material for forming an opaque portion partly penetrates into the powdery raw material for forming a transparent portion with the result of occurrence of bubbles in the vicinity of the interfacial boundary. Further the opaque silica glass portion and the transparent silica glass portion, both of which shrink in the course from fusion bonding to the completion of vitrification, exhibit different shrinkages, and thus, the resulting silica glass article tends to warp.

In the process of (4), it is difficult to melt uniformly in thickness the surface portion of the bubble-containing opaque silica glass article, and further to deaerate the molten surface portion of a satisfying extend.

SUMMARY OF THE INVENTION

In view of the foregoing, a primary object of the present invention is to provide an opaque silica glass article having a transparent portion and an opaque portion containing bubbles uniformly distributed therein, characterized as exhibiting excellent high-temperature viscosity and heat insulation, and having a smooth surface, i.e., not having a roughness, which has occurred due to bubbles contained in the glass article, over the entire surface or part of the surface.

Another object of the present invention is to provide a process for producing the above-mentioned opaque silica glass article industrially advantageously, whereby a silica glass article of a complicated shape such as, for example, a flange-form, ring-shaped, columnar, square pillar or hollow-square pillar can be directly produced from raw materials.

In accordance with the present invention, there is provided an opaque silica glass article comprising a transparent portion and an opaque portion, wherein the glass of the opaque portion has an apparent density of 1.70 to 2.15 g/cm$^3$ and contains $5 \times 10^4$ to $5 \times 10^6$ bubbles per cm$^3$ of the glass, said bubbles having an average bubble diameter of 10 to 100 $\mu$m; and the glass of the transparent portion has an apparent density of 2.19 to 2.21 g/cm$^3$ and the amount of bubbles having a diameter of at least 100 $\mu$m in the transparent portion is not more than $1 \times 10^3$ per cm$^3$ of the glass.

In another aspect of the present invention, there is provided a process for producing the above-mentioned opaque silica glass article, which comprises the steps of:

charging a heat-resistant mold with a raw material for forming the opaque portion of the silica glass article, which is a uniform mixture comprising a finely divided silica powder having an average particle diameter of 10 to 500 $\mu$m with 0.001 to 0.05 parts by weight, based on 100 parts by weight of the silica powder, of a finely divided silicon nitride powder, and a raw material for forming the transparent portion of the silica glass article so that the two starting materials are located in the positions corresponding to the opaque portion and the transparent portion, respectively, of the silica glass article to be produced; and heating the raw materials in vacuo at a temperature in the range of the melting temperature of the raw materials and 1,900° C. whereby the raw materials are vitrified.

DESCRIPTION OF THE PREFERRED EMBODIMENTS

(1) Raw Materials

Figure 1:
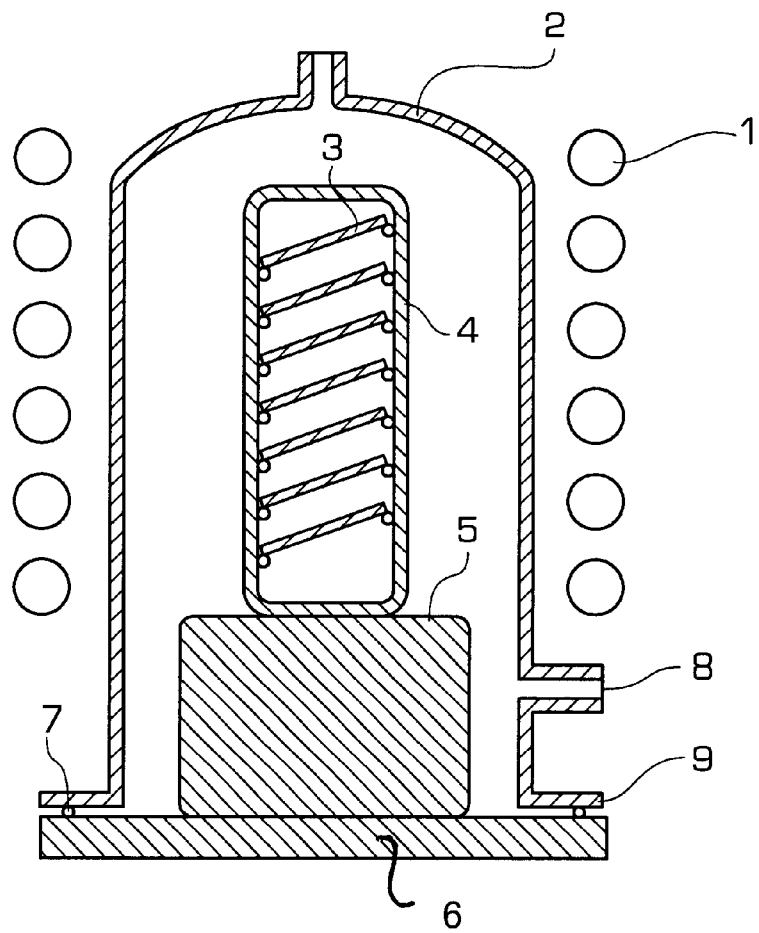
FIG. 1 is a vertical cross-sectional view illustrating a furnace for heating silicon wafers.

As the raw material for forming an opaque portion of the silica glass article of the invention, a mixture of a finely divided silica powder and a silicon nitride powder is preferably used. As the raw material for forming a transparent portion of the silica glass article of the invention, a finely divided silica powder or a shaped transparent silica glass article is used. More specifically, in the opaque silica glass article having an opaque portion and a transparent portion of the invention (hereinafter abbreviated to "silica glass article of the invention"), the opaque portion constituting the main part of the silica glass article of the invention is made preferably by melting a mixture of a finely divided silica powder and a finely divided silicon nitride powder. The transparent portion of the silica glass article of the invention, which forms the entirety or a part of a surface of the silica glass article, is made from a finely divided silica powder or a shaped transparent silica glass article. In the following explanation of the transparent portion, either a finely divided silica powder or a shaped silica glass article is used, but it should be construed that any of the silica powder and the shaped silica glass article can be used.

(1-1) Silica Powder

As the finely divided silica powder used in the invention, a finely divided crystalline or amorphous silica powder having a high purity and containing metal impurities such as Na, K, Mg and Fe each in an amount of 0 to 1 ppm is preferably used for the following reason. When the silica glass article of the invention is heated, for example, when a flange made thereof is attached to a wafer-heating furnace and is exposed to a high temperature, the vaporization of impurities exhibiting a high vapor pressure leading to an environmental contamination, the partial crystallization of the silica glass article of the invention occasionally leading to rupture thereof, and the coloration of the silica glass article of the invention can be avoided by the use of the high-purity silica powder.

The high-purity silica powder is prepared by a synthesis process or a purification of a natural raw material. For example, an amorphous silica powder is synthesized by a process wherein an aqueous alkali metal silicate solution (water-glass) is reacted with an acid to remove an alkali metal thereby yielding silica, a process for hydrolyzing $SiCl_4$ to give silica, and a process wherein a silicon alkoxide is hydrolyzed to give silica. Of these, the first process, especially a process wherein an aqueous alkali metal silicate solution (water-glass) composed of an alkali metal such as Na, K or Li and silicon dioxide is allowed to react with an inorganic acid such as sulfuric acid, nitric acid or hydrochloric acid, is preferable from a viewpoint of commercial production. A crystalline silica powder can be obtained from natural raw material by treating natural quartz with hydrofluoric acid.

Preferably the finely divided silica powder has an average particle diameter of 10 to 500 $\mu$m in view of fluidity for charging into a heat-resistant mold. If the average particle diameter is smaller than 10 $\mu$m, the silica powder has a poor fluidity and is difficult to charge into the mold. In contrast, if the average particle diameter is larger than 500 $\mu$m, voids among the particles are too large and large bubbles having a diameter of at least 300 $\mu$m tend to occur, and especially, in the case where a transparent portion of the silica glass article is formed from the silica powder, a salient amount of large bubbles having diameter of larger than 500 $\mu$m occasionally occur.

The diameter of bubbles contained in the silica glass article of the invention varies depending upon the particular average diameter of the silica powder, and thus, the bubble diameter can be varied by controlling the average diameter of the silica powder. Namely, fine bubbles with a small diameter and bubbles with a large diameter can be obtained from a silica powder having a small average diameter and a silica powder having a large average diameter, respectively.

(1-2) Silicon Nitride Powder

As the silicon nitride powder, a high-purity silicon nitride prepared by nitriding a starting material such as silicon tetrachloride, silicon or silica is preferably used. By using the high purity silicon nitride powder, when the resulting opaque silica glass article of the invention is heated, the vaporization of impurities exhibiting a high vapor pressure leading to an environmental contamination, the partial crystallization of the silica glass article of the invention occasionally leading to rupture thereof, and the coloration of the silica glass article of the invention can be avoided.

The amount of the silicon nitride powder is 0.001 to 0.05 parts by weight based on 100 parts by weight of the silica powder. If the amount of the silicon nitride powder is smaller than 0.001 parts by weight, the amount of bubbles formed is too small, and the opaque silica glass article has a poor heat insulation. In contrast, if the amount of the silicon nitride powder is larger than 0.05 parts by weight, the bubbles formed become too large and the opaque silica glass article has a poor mechanical strength.

The silicon nitride powder preferably has an average particle diameter of 0.1 to 1 $\mu$m, more preferably 0.1 to 0.5 $\mu$m. By using the silicon nitride powder having an average particle diameter falling within this range, the amount and size of bubbles formed become adequate, and the uniform mixing of the silicon nitride powder and the silica powder can be effected without agglomeration.

(2) Mixing

A finely divided silica powder and a finely divided silicon nitride powder are mixed together to prepare a raw material for forming the opaque portion of the silica glass article of the invention. The extent and state of dispersion of the silicon nitride powder in the mixture influences upon the diameter and distribution of bubbles formed, the silicon nitride should be uniformly dispersed in the powdery mixture. The mixing means is not particularly limited provided that a uniform dispersion can be obtained. For example, a mortar and a ball mill can be used. To obtain a highly uniform dispersion of the silicon nitride powder in the powdery mixture, a wet process using a dispersing medium is preferably employed. As examples of the dispersing medium, there can be mentioned water and alcohols such as ethanol and methanol. To enhance the dispersibility of the silicon nitride powder in the powdery mixture, an ultrasonic vibration can be applied by using an ultrasonic generator.

(3) Charging of Raw Material in Mold

The raw material for forming the transparent portion of the silica glass article and the raw materials for forming the opaque portion thereof are charged in a heat-resistant mold. First, charging of a finely divided silica powder as the transparent portion-forming raw material will be explained.

Namely, the silica powder as the transparent portion-forming raw material and the silica/silicon nitride powdery mixture as the opaque portion-forming raw material are placed in a heat-resistant mold. The material and shape of the heat-resistant mold are not particularly limited provided that the mold exhibits a good resistance and does not influence the raw material at the melt fusion step. The heat-resistant mold may be either a single mold or a split mold composed of two or more parts. The split mold is used for molding a silica glass article having a complicated shape. The shape and combination of two or more parts of the split mold can be appropriately chosen depending upon the desired shape of the opaque silica glass article. As the material of the mold, there can be mentioned those which do not react with silica to any appreciable extent, such as carbon, boron nitride and silicon carbide. To impart a good sliding property between the inner wall of the mold and the raw material, carbon felt or carbon paper can be inserted between the inner wall of the mold and the raw material during charging of the raw material and heating the raw material.

The raw material for forming the opaque portion of the silica glass article (namely, a powdery silica/silicon nitride mixture) and the raw material for forming the transparent portion thereof (namely a silica powder) are placed in the mold so that the raw materials are located in the positions corresponding to the opaque portion and the transparent portion, respectively, of the silica glass article to be shaped.

Figure 2:
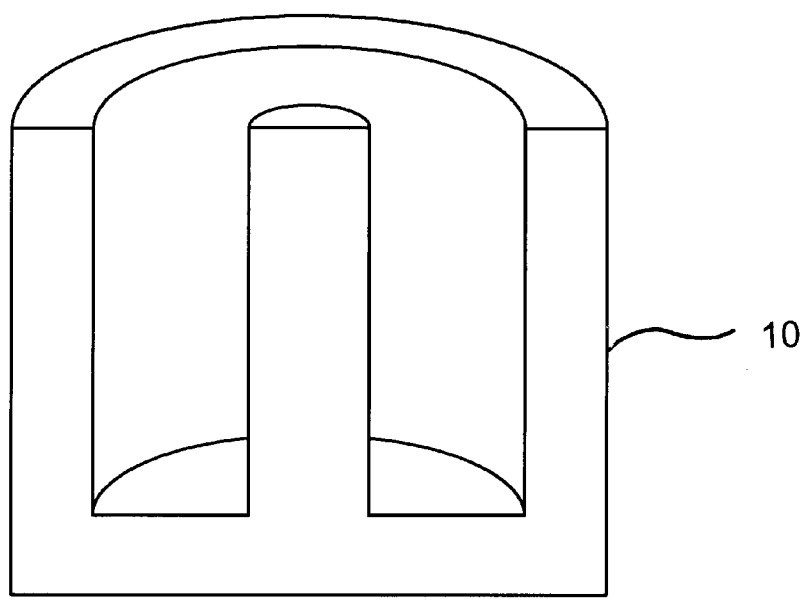
FIG. 2 is a perspective view illustrating a heat-resistant mold having a ring-form cavity, which is cut along a central vertical plane.
Figure 3:
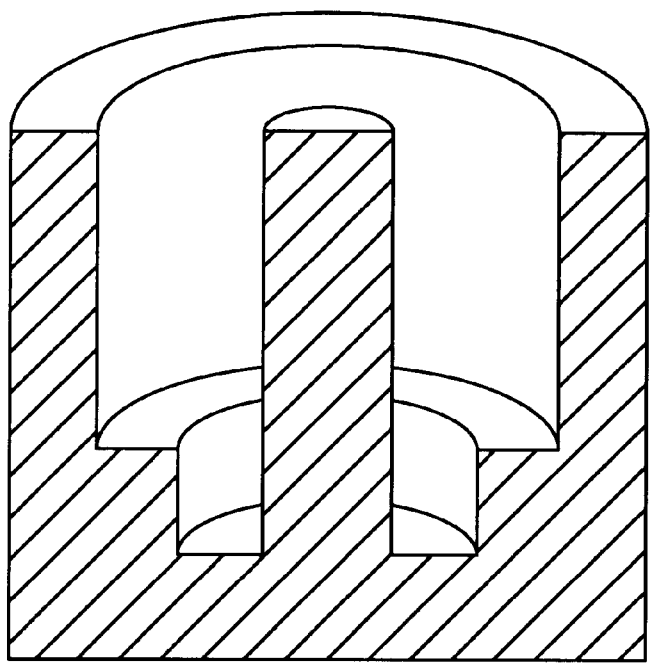
FIG. 3 is a perspective view of a heat-resistant mold having a flange-shaped cavity, which is cut along a central vertical plane.
Figure 4:
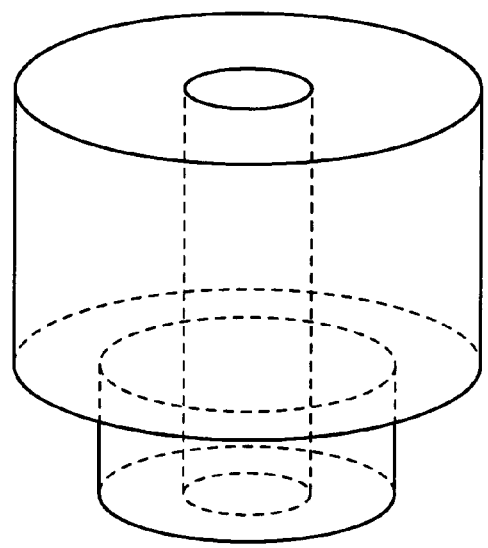
FIG. 4 is a perspective view of a flange-shaped opaque silica glass article made by using the mold illustrated in FIG. 3.
Figure 5:
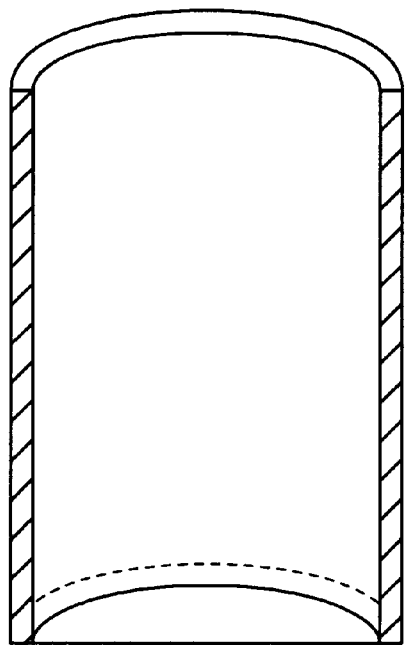
FIG. 5 is a perspective view of a heat-resistant mold having a columnar cavity, which is cut along a central vertical plane.
Figure 6:
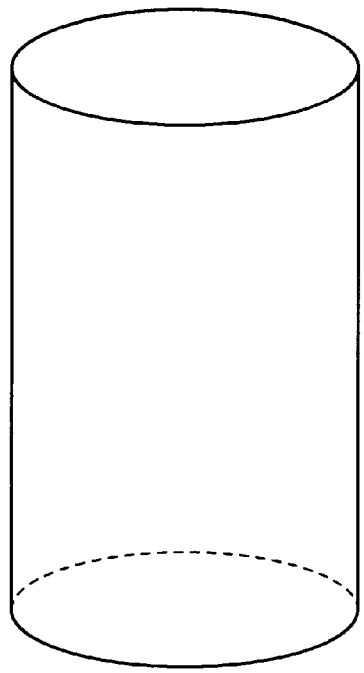
FIG. 6 is a perspective view of a columnar opaque silica glass article made by using the mold illustrated in FIG. 5.
Figure 7:
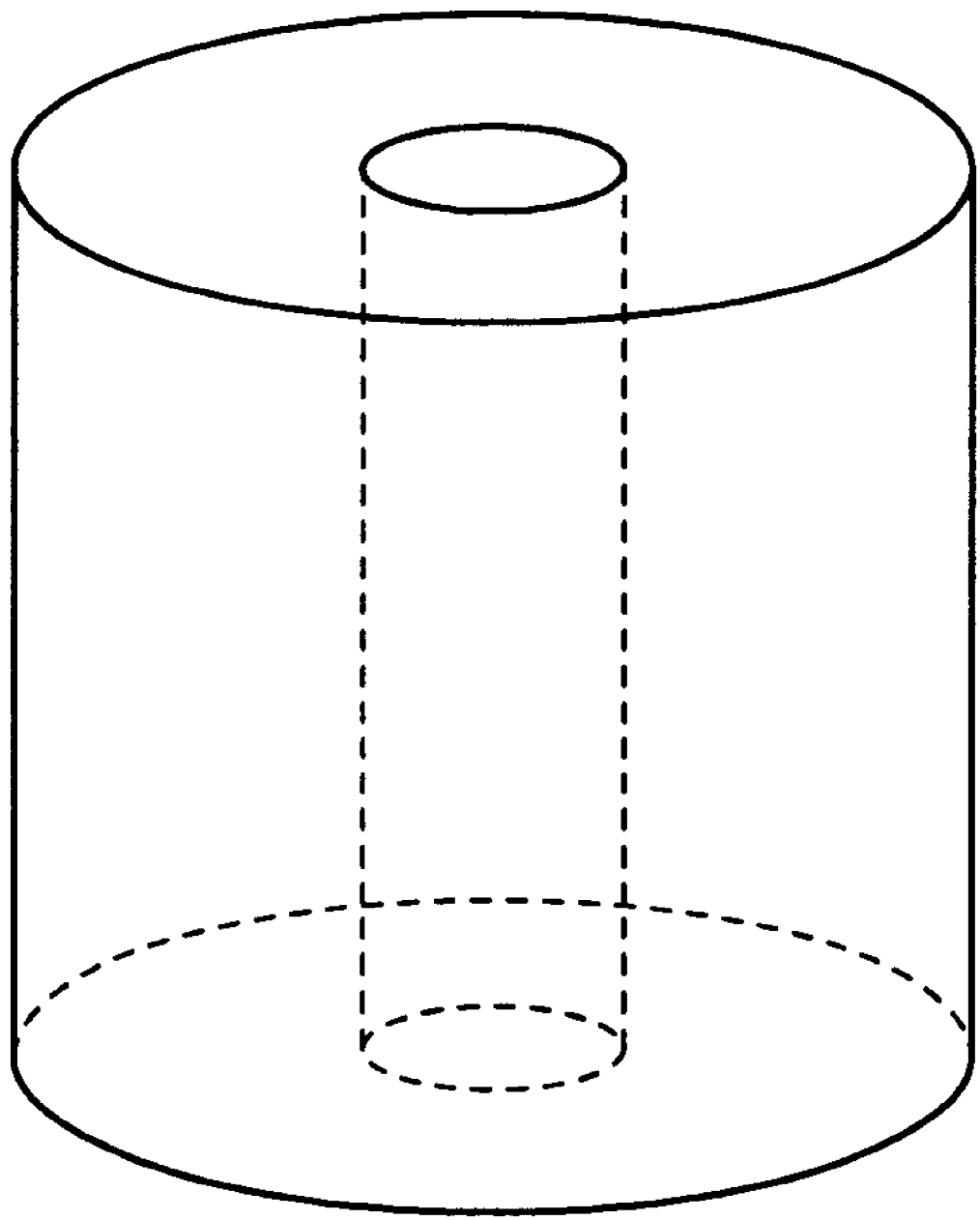
FIG. 7 is a perspective view of a ring-form opaque silica glass article made by using the mold illustrated in FIG. 2.
Figure 8:
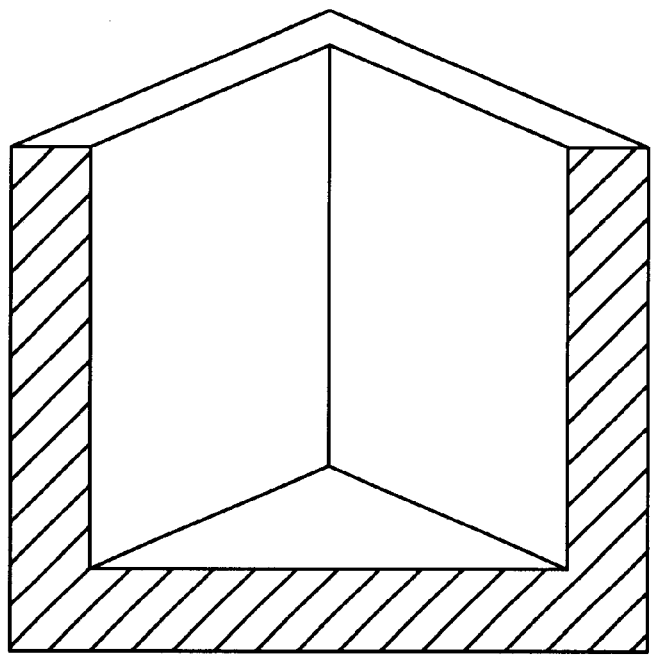
FIG. 8 is a perspective view of a heat-resistant mold having a square pillar-form cavity, which is cut along a central vertical plane.
Figure 9:
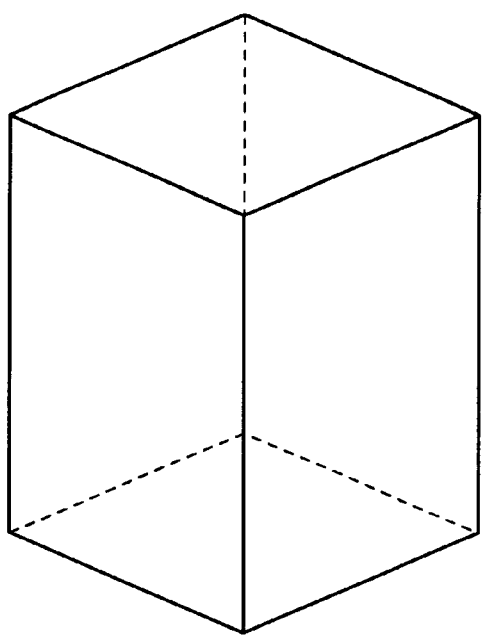
FIG. 9 is a perspective view of a square pillar-form opaque silica glass article made by using the mold illustrated in FIG. 8.
Figure 10:
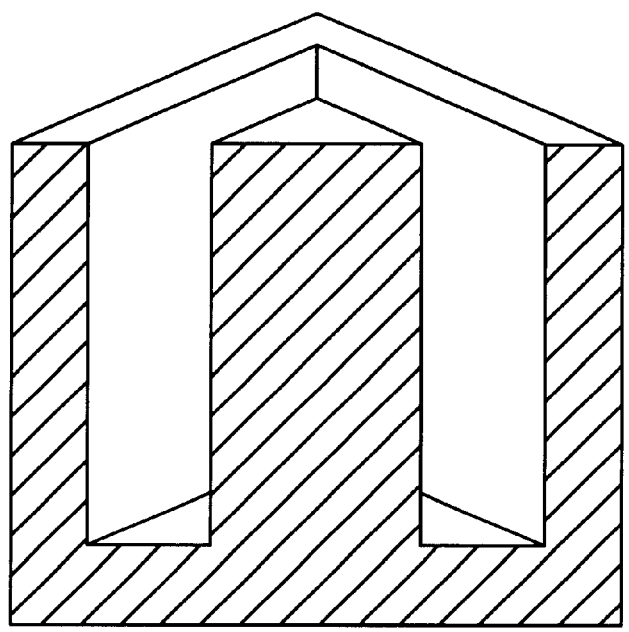
FIG. 10 is a perspective view of a heat-resistant mold having a hollow square pillar-form cavity, which is cut along a central vertical plane.
Figure 11:
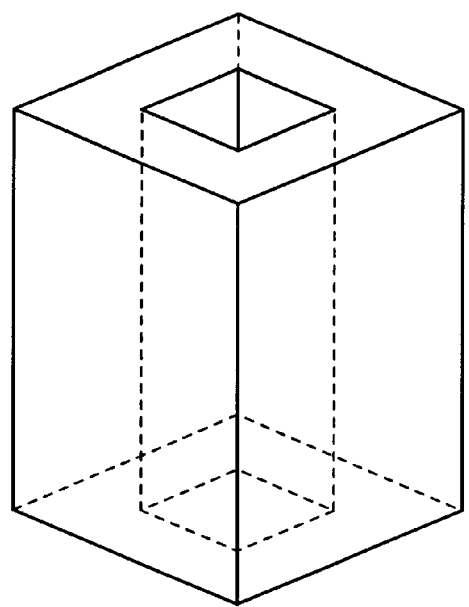
FIG. 11 is a perspective view of a hollow square pillar-form opaque silica glass article made by using the mold illustrated in FIG. 10.

The shape and size of the heat-resistant mold is determined depending upon the desired shape and size of the opaque silica glass article. For example, when a heat-resistant mold having a flange-shaped cavity as illustrated in FIG. 3 is used, a flange-shaped opaque silica glass article as illustrated in FIG. 4 is produced. When a heat-resistant mold having a columnar cavity as illustrated in FIG. 5 is used, a columnar opaque silica glass article as illustrated in FIG. 6 is produced. When a heat-resistant mold having a ring-form cavity as illustrated in FIG. 2 is used, a ring-form opaque silica glass article as illustrated in FIG. 7 is produced. When a heat-resistant mold having a polyhedron cavity such as square pillar-form cavity as illustrated in FIG. 8 is used, a polyhedron (such as square pillar-form) opaque silica glass article as illustrated in FIG. 9 is produced. When a heat-resistant mold having a hollow square pillar-form cavity as illutrated in FIG. 10 is used, a hollow square pillar-form opaque silica glass article as illustrated in FIG. 11 is produced. As a modified form of the ring-form article of FIG. 7, a ring-form silica glass article, one end of which is closed, can be produced. Similarly, as a modified form of the hollow square pillar-form article of FIG. 11, a hollow square-form silica glass article, one end of which is closed, can be produced.

In a specific example of charging the heat-resistant mold with the raw materials, a silica powder is laid on the bottom of a heat-resistant mold having a columnar cavity, a powdery silica/silicon nitride mixture is laid thereon and further a silica powder is lead thereon. By heating the thus-filled powdery raw materials, a columnar opaque silica glass article having a transparent top layer, an opaque central body and a transparent bottom layer is produced. In another specific example of charging the heat-resistant with the raw materials, a silica powder is laid on the bottom of a heat-resistant mold having a columnar cavity, a cylindrical auxiliary frame having a diameter slightly smaller than the diameter of the columnar cavity is placed on the laid silica powder, a powdery silica/silicon nitride mixture is charged within the cylindrical auxiliary frame, a silica powder is filled in a cylindrical space between the cylindrical auxiliary frame and the inner wall of the mold, the cylindrical auxiliary frame is drawn out gently; and finally, a silica powder is laid on the top of the charged raw materials. By heating the thus-filled raw materials, a columnar opaque silica glass article having a transparent layer covering the entire surface of the glass article can be produced.

The packing density of the powdery raw materials within the mold is preferably in the range of 0.7 to 1.8 g/cm$^3$. The packing density of the raw material for forming the opaque portion should preferably be as uniform as possible so as to form the opaque portion having bubbles uniformly dispersed in the opaque portion.

Secondly, placing of a transparent silica glass article as the transparent portion-forming raw material within the mold will be explained.

In one specific example, the powdery silica/silicon nitride mixture for forming the opaque portion and a transparent ring-form silica glass article for forming the transparent portion are charged in the mold having a ring-form cavity as illustrated in FIG. 2. The transparent ring-form silica glass article is previously fabricated so that it is capable of being placed within the mold. The transparent ring-form silica glass article preferably has an apparent density of 2.19 to 2.21 g/cm$^3$ and contains not more than $1\times10^3$ bubbles per cm$^3$, said bubbles having a diameter of at least 100 μm. An opaque silica glass article made by using the transparent ring-form silica glass article is characterized in that the exposed surface of the transparent portion does not have bubbles to any appreciable extent and thus, when the surface is subjected to cleaning, surface roughness due to development of bubbles does not occur, and thus, good sealing property can be obtained.

The shape and size of the transparent ring-form silica glass article are not particularly limited provided that it can be placed within the mold and it forms a sealing surface of the resulting opaque silica glass article. Usually the transparent ring-form silica glass article has a shape and size corresponding to those of the resulting opaque silica glass article.

The transparent ring-form silica glass article can be prepared by a process wherein the silica powder is melted by applying an oxyhydrogen flame or melted in an electric furnace in vacuo to give a transparent silica glass block, followed by grinding the block into the desired shape and size. In the process employing an electric furnace, preferably a heat-resistant mold having a ring-form cavity having a size substantially the same as that of the transparent portion of the opaque silica glass article is used. By using this mold, a transparent ring-form silica glass article having a size similar to that of the transparent portion can be produced, and thus, the after-processing of the transparent ring-form silica glass article is easy and simple, and manhour and material loss are minimized.

The material of the heat-resistant mold used is not particularly limited provided that it is resistant to heat and does not influence the raw material to any appreciable extent at the heating step. For example, the heat-resistant mold can be made of materials which do not easily react with silica, such as carbon, boron nitride and silicon carbide.

To enhance the sliding property of the raw materials on the inner wall of the mold, preferably carbon felt or carbon paper is placed between the inner wall of the mold and the raw materials at the step of charging and heat-melting.

The order of charging of the transparent silica glass article and the powdery silica/silicon nitride mixture for forming the opaque portion is not particularly limited, but, it is preferable that the transparent silica glass article is first placed on the bottom of the mold, and then the powdery mixture is charged on the silica glass article because undesirably large compaction of the powdery mixture can be avoided and gases evolved at the heat-melting step can be effectively removed. The packing density of the powdery mixture is preferably in the range of 0.7 to 1.8 g/cm$^3$ for uniformly charging it in the mold.

(4) Vitrification and Bubble Formation

In order to completely decompose silicon nitride in the powdery silica/silicon nitride mixture to form bubbles and to convert the powdery silica/silicon nitride mixture into an opaque silica glass, and further, to convert a silica powder, if used, as a raw material for forming the transparent portion into a transparent glass, the raw materials charged within the mold are heated to be thereby melted. The heating apparatus used for heating the mold is not particularly limited provided that it is capable of converting the raw material into a glass state, and, for example, an electric furnace is used.

The raw materials are heated to a temperature between the temperature at which the raw materials are melted, and 1,900° C. When an amorphous silica powder is used as a raw material, it is melted via cristobalite, and thus, the temperature at which the raw materials are melted is 1,713° C. at normal pressure. When a crystalline silica powder other than cristobalite is used as a raw materials, it is melted substantially without through cristobalite and, thus, the temperature at which the raw materials are melted is lower than the above melting temperature for the amorphous silica powder. It should be noted that, when a crystalline silica powder other than cristobalite is heated to a temperature lower than the melting temperature, at least part of this raw material is not melted, the resulting silica glass is very fragile. When an amorphous silica powder is used and a part or the entirety thereof is transferred to crystalline cristobalite, the cristobalite is not melted at the heating step, and the resulting glass is very fragile. If the raw material is heated to a temperature higher than 1,900° C., the opaque portion of the opaque silica glass article have bubbles with a large size, and consequently, the density of glass becomes low, and the mechanical strength is too low to machine the glass article into a desired shape and size. The heating time varies depending upon the particular heating temperature, and is not particularly limited provided that the entire amount of the raw material is melted and vitrified. Usually the heating time is about one hour or shorter.

In the course of heating the raw material, it is preferable that a vacuum atmosphere is kept during a period spanning from the state wherein pores among the particles of the powdery raw material are open to the state wherein said voids are closed. The degree of vacuum is preferably such that the pressure is not higher than 50 mmHg, more preferably not higher than 10 mmHg. By conducting the heating in vacuo, gases eluted from nitrogen in the solid solution produced by the reaction of silicon nitride with silica in the powdery silica/silicon nitride mixture, and gases generated by decomposition of the raw material form bubbles uniformly distributed in the silica glass article. Further, when a transparent silica glass article is used as a transparent portion-forming raw material, the residual fine bubbles within the transparent portion can be removed.

In the course where the raw materials charged in a mold are melted in vacuo whereby they are vitrified and bubbles are formed, a cover made of, for example, carbon or the like can be placed on the charged raw materials so that a uniform pressure is applied onto the entire raw materials, or the bubbles formed are confined within the molten material or controlled so as not to escape to the outside.

At the time when the molten material maintained at a high temperature is converted to a glass state, an inert gas is introduced into a mold. The inert gas used is not particularly limited provided that it does not react substantially with the mold, the raw material and the product, and includes, for example, nitrogen, argon and helium. Of these, nitrogen and argon are preferably in view of the cost and air tightness. The pressure of the inert gas is usually normal pressure so that, when the resulting glass is reheated, for example, subjected to flaming treatment, bubbles within the glass are neither greatly expanded nor shrunk. A slightly higher or lower pressure may be employed.

After the heating for vitrification, the molten material is cooled to room temperature. Usually the molten material is cooled by allowing it to stand or by a cooling apparatus to about 1,000° C. The rate of cooling is usually about 1,000° C./hour. Finally the material is cooled to room temperature. It should be noted that, the molten material tends to crystallize in the course of cooling, especially at a high temperature. Therefore, the molten material should be cooled relatively rapidly in a high temperature region to avoid the undesirable crystallization. To enhance the rate of cooling, the same inert gas as that used at the heat-melting step can be introduced. In a low temperature region in the course of cooling, there is no problem of crystallization, and thus, the material is usually left to stand for cooling.

(5) Opaque Silica Glass Article

The silica glass article of the invention has an opaque portion having an apparent density of 1.70 to 2.15 g/cm$^3$, preferably 1.80 to 2.12 g/cm$^3$ and containing $5 \times 10^4$ to $5 \times 10^6$ bubbles per cm$^3$ which bubbles have an average particle diameter of 10 to 100 µm. These characteristics are important for imparting good mechanical strength and processability to the glass article.

The diameter and amount of independent bubbles contained in the opaque portion vary depending upon the amount of silicon nitride powder added, the particle diameter and distribution of silica powder, the melting temperature and the pressure of gas introduced. For example, an opaque portion with good heat insulating property, which has an apparent density of 1.95 to 2.05 g/cm$^3$, and contain $7 \times 10^5$ to $8 \times 10^5$ bubbles having an average bubble diameter of 50 to 70 µm, is obtained by selecting the following conditions: amount of silicon nitride powder added=0.01 to 0.02 part by weight based on 100 parts by weight of silica powder, average particle diameter of silica powder=100 to 200 µm (particle diameter distribution range=10 to 600 µm), melting temperature of 1,800 to 1,850° C., pressure of introduced gas of 1.0 to 2.0 kgf/cm$^2$. An opaque portion with high heat insulating property, which has an apparent density of 2.05 to 2.12 g/cm$^3$, and contains $1 \times 10^6$ to $2 \times 10^6$ bubbles having an average bubble diameter of 30 to 50 µm, is obtained by selecting the following conditions: amount of silicon nitride power added=0.005 to 0.02 part by weight based on 100 parts by weight of silica powder, average particle diameter of silica powder=50 to 100 µm (particle diameter distribution range=10 to 200 µm), melting temperature of 1,750 to 1,850° C., pressure of introduced gas of 1.0 to 2.0 kgf/cm$^2$. The amount of bubbles greatly varies depending upon the particle diameter of silica powder. More specifically an opaque silica glass article having an excellent heat insulating property, which contains a large amount of bubbles having a small average diameter, is obtained by using a finer silica powder.

The opaque portion of the glass article of the invention contains bubbles uniformly distributed therein and has a white appearance. The white opaque portion is characterized as possessing preferably a linear transparency of not larger than 5% as measured by irradiating the opaque portion with light having a wavelength of 300 to 900 nm and expressed as the value at a thickness of 1 mm. By the reduced linear transparency, heat rays are readily scattered, and thus, the silica glass article of the invention exhibits excellent heat insulating property as well as a reduced thermal conductivity.

The transparent portion of the opaque silica glass article, which has a function of protecting the surface of the opaque portion, is characterized as having an apparent density of 2.19 to 2.21 g/cm$^3$. The amount of bubbles having a diameter of at least 100 µm in the transparent portion is not more than $1 \times 10^3$ per cm$^3$ of the glass. If the amount of bubbles with a diameter of at least 100 µm is more than $1 \times 10^3$ per cm$^3$, a salient amount of bubbles are exposed on the surface of the transparent portion, and good sealing property cannot be obtained. Further, the transparent portion preferably has a linear transparency of at least 90% as measured by irradiating said portion with the transparent portion with light having a wavelength of 300 to 900 nm and expressed as the value at a thickness of 1 mm. When the linear transparency is at least 90%, the sealing property is more enhanced.

According to the process of the invention, a hydroxyl group is not introduced in the glass at the step of heat-fusion, but is rather expected to be volatilized from the molten material. The opaque silica glass article containing the thus-reduced amount of a hydroxyl group exhibits a high viscosity at a high temperature, i.e., excellent high-temperature viscosity.

The shape of the opaque silica glass article of the invention is not limited and is suitably chosen depending upon the particular use thereof. For example, the shape thereof is flange-form, ring-shaped, columnar, square pillar or hollow-square pillar.

Especially, when a ring-form opaque silica glass article is used for a flange attached to a furnace tube, the glass article preferably has a wall thickness of not larger than 150 mm and a height (i.e., a length along the axis of the ring) of 30 to 250 mm in view of the uniformity in density of the opaque portion thereof and the heat insulation thereof.

The ratio of the opaque portion to the transparent portion varies depending upon the particular use, but the amount of the transparent portion in the opaque silica glass is preferably in the range of 2 to 30% based on the sum of the transparent portion and the opaque portion.

The invention will now be specifically described by the following examples that by no means limit the scope of the invention.

The characteristics of raw materials and opaque silica glass articles were determined by the following method.

(1) Impurity

The impurities contained in a silica powder were analyzed by ICP (inductively coupled plasma) atomic emission spectrochemical analysis.

(2) Glass State

The glass state of the transparent portion and opaque portion of an opaque silica glass article was examined by X-ray diffraction as follows.

A specimen having a size of 20 mm×10 mm×2 mm (thickness) was cut by a cutter from each of the opaque portion and the transparent portion. Each specimen was examined by an X-ray diffraction analyzer (supplied by MAC Science Co., type MXP3), and the glass state was confirmed by the presence of diffraction peak occurring due to crystals such as quartz and cristobalite in the obtained diffraction pattern.

(3) Apparent Density

A specimen having a size of 30 mm×30 mm×10 mm (thickness) was cut by a cutter from each of the opaque portion and the transparent portion. Density of each specimen was measured by using an electronic force balance (supplied by Mettler Instrument Co., type AT261) according to the Archimedean method.

(4) Diameter and Amount of Bubbles

A specimen having a size of 30 mm×10 mm×0.3 mm (thickness) was cut by a cutter from each of the opaque portion and the transparent portion. The diameter and amount of bubbles in each specimen were measured by using a polarization microscope having a lens with graduation(supplied by Olympus Optical Co., type BH-2). The average diameter of bubbles in the opaque portion was determined by counting number of bubbles, calculating the total volume of the bubbles provided that the bubbles are regarded as having a spherical form, dividing the total volume of bubbles by the number of bubbles to determine the average bubble volume, and then, calculating the average diameter, i.e., the average bubble diameter. The amount of bubbles in the transparent portion was determined by counting the number of bubbles having a diameter of at least 100 μm in a view field of 10 mm×10 mm×0.3 mm (depth) and calculating the number of bubbles per cm$^3$.

(5) Particle Diameter

Distribution of particle diameter and average particle diameter of a powdery raw material were measured by the laser diffraction scattering method using Coulter LS-130 (supplied by Coulter Electronics Co.)

(6) Packing Density

Packing density of a powdery raw material was determined by packing a predetermined amount of the powdery raw material in a heat-resistant mold, and dividing the amount by weight of the packed material by the volume occupied by the packed material.

(7) Presence of Pore

A glass article was cut by a cutter and the presence of pores in the cut surface was checked by visual examination.

(8) Light Transmission (Linear Transparency)

Each of the opaque portion and the transparent portion was cut into a rectangular plate, and both major surfaces of the plate were polished by an alumina abrasive grain of #1200 to prepare a specimen having a size of 30 mm×10 mm×1 mm (thickness). The linear transparency was measured by irradiating the specimen with light having a wavelength of 300, 500, 700 or 900 nm, projected perpendicularly to the major surfaces of the specimen (band-pass 2 nm) by using a spectrophotometer (supplied by Hitachi Ltd., double-beam spectrophotometer type 200).

(9) Total Cross-Sectional Area of Bubbles

Bubbles are regarded as having a spherical form, and the total cross-sectional area of bubbles is defined as the sum of circles each including the diameter of bubble. The total cross-sectional area of bubbles was determined by calculating the average cross-sectional area of bubbles from the average bubble diameter, and multiplying the average cross-sectional area of bubbles by the amount of bubbles.

EXAMPLE 1

Powdery natural quartz having an average particle diameter of 300 μm and a particle diameter distribution in the range of 30 to 500 μm was treated with hydrofluoric acid to prepare a high-purity powdery silica (hereinafter referred to as "powdery quartz"). Silicon tetrachloride was treated with ammonia to prepare a powdery silicon nitride having an average particle diameter of 0.5 μm. A powdery mixture of powdery quartz with the powdery silicon nitride was prepared as follows. 0.01 part by weight of the powdery silicon nitride was put into 50 parts by weight of ethanol, and the mixture was stirred while an ultrasonic vibration was applied. To the thus-prepared silicon nitride dispersion, 100 parts by weight of powdery quartz was incorporated and the mixture was thoroughly stirred. Then ethanol was removed from the mixture by using a vacuum evaporator and the mixture was dried to obtain a powdery quartz/silicon nitride mixture (hereinafter referred to "mixed powder") as a raw material for forming an opaque portion of an opaque silica glass article.

Figure 12:
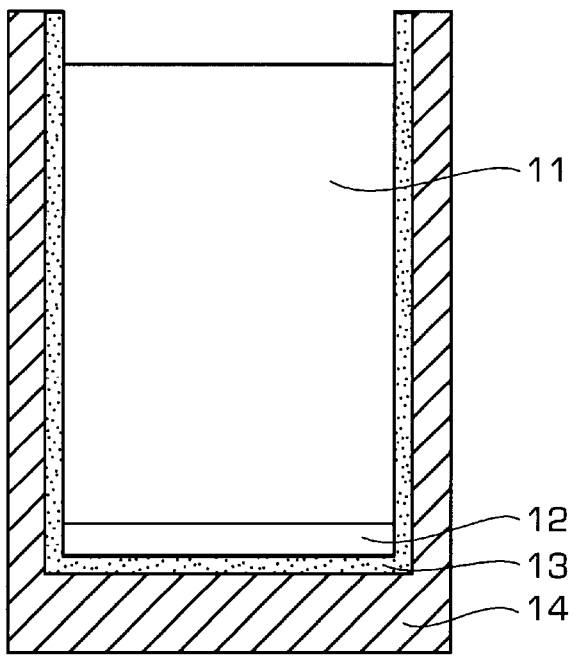
FIG. 12 is a vertical cross-sectional view illustrating a heat-resistant mold in which a powdery raw material is charged.
Figure 13:
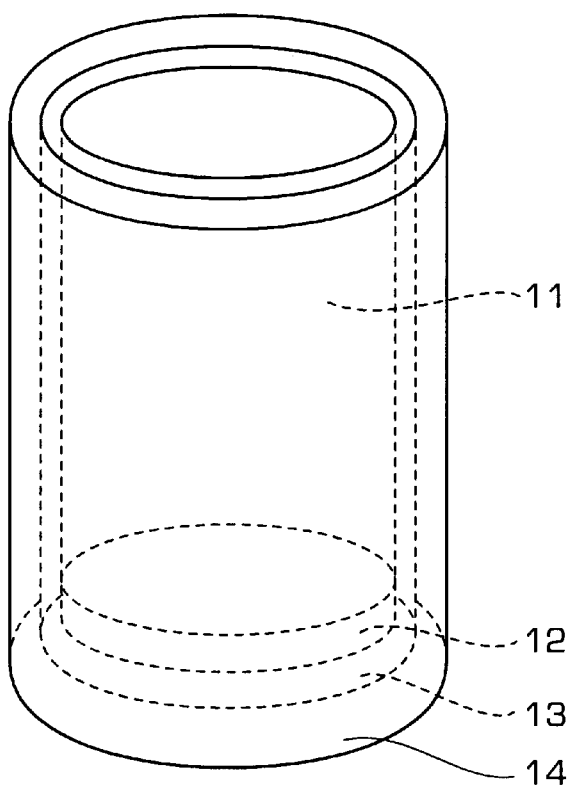
FIG. 13 is a perspective view illustrating the powdery raw material-charged heat-resistant mold illustrated in FIG. 12.

The above-mentioned powdery quartz was also used as a raw material for forming a transparent portion of the opaque silica glass article. Namely, as illustrated in FIG. 12 and FIG. 13, 300 g of powdery quartz 12 as the raw material for forming the transparent portion was charged in a cylindrical carbon crucible 14 having an outer diameter 130 mm, an inner diameter of 100 mm and a depth of 200 mm and having carbon felt 13 with a thickness of 2 mm adhered on the inner wall of the crucible. 900 g of the mixed powder 11 was placed on the charged powdery quartz 12. The charged powdery quartz 12 and the charged mixed powder 11 had a packing density of 1.4 g/cm$^3$.

The state of the charged powdery quartz 12 and the charged mixed powder 11 is illustrated in FIG. 12 and FIG. 13. The crucible 14 was placed in an electric furnace, and the inner atmosphere was vacuumed to a pressure of 1×10$^{-3}$ mm Hg. Then the temperature was elevated from room temperature to 1,800° C. at a rate of 300° C./hour. The crucible was maintained at 1,800° C. for 10 minutes, and then, a nitrogen gas was introduced into the electric furnace until the inner pressure reached normal pressure (1 kgf/cm$^2$) and the heating was ceased. Thereafter the power switch of the electric surface was turned out and the crucible was allowed to stand. The inner temperature of the electric furnace reached 1,000° C. about 50 minutes later, and gradually fell to room temperature.

Figure 14:
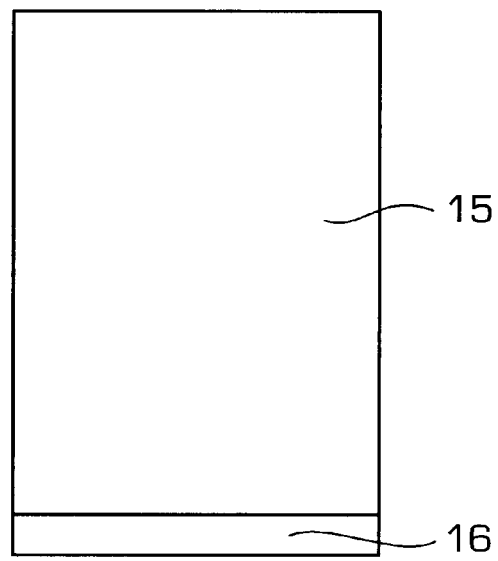
FIG. 14 is a side view of an opaque silica glass article made by using the mold illustrated in FIG. 12 and FIG. 13.
Figure 15:
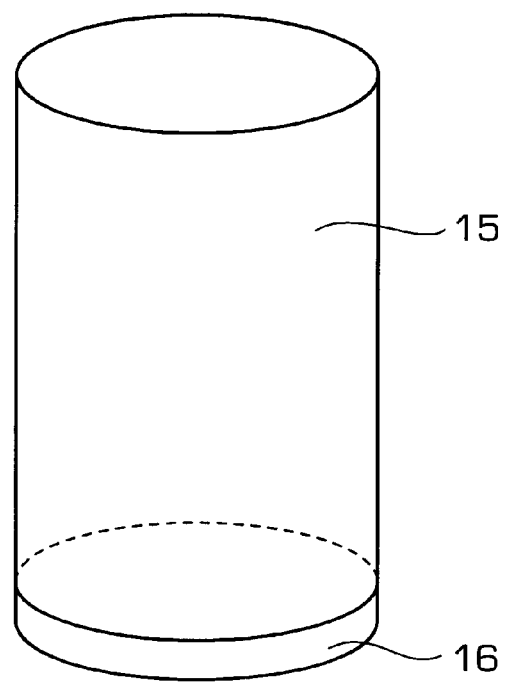
FIG. 15 is a perspective view of the opaque silica glass article illustrated in FIG. 14.

The thus-made glass article was a columnar opaque silica glass article having a structure composed of an opaque portion 15 having a multiplicity of bubbles distributed therein, and a transparent portion 16 firmly bonded to the opaque portion 15, as illustrated in FIG. 14 and FIG. 15.

EXAMPLE 2

The same powdery quartz as that used in Example 1 was pulverized by using a dry ball mill and further sieved to obtain a powdery quartz having an average particle diameter of 500 μm and a particle diameter distribution in the range of 10 to 200 μm. 100 parts by weight of the powdery quartz and 0.03 part by weight of silicon nitride powder was mixed together to obtain a powdery mixture. By substantially the same procedure as that employed in Example 1, 300 g of the powdery quartz was charged in a carbon crucible and then 900 g of the powdery mixture was charged on the powdery quartz. The charged powdery quartz and the charged powdery mixture had a packing density of 1.4 g/cm$^3$. The charged raw materials were heated and then cooled by the same procedure as that in Example 1 to obtain a columnar opaque silica glass article composed of an opaque portion 15 and a transparent portion 16 firmly bonded to the opaque portion 15, as illustrated in FIG. 14 and FIG. 15.

EXAMPLE 3

The same powdery quartz as that used in Example 1 was pulverized by using a dry ball mill and further sieved to obtain a powdery quartz having an average particle diameter of 50 μm and a particle diameter distribution in the range of 10 to 200 μm. A powdery mixture of the powdery quartz and a silicon nitride powder was prepared by the same procedure as that employed in Example 1. By substantially the same procedure as that employed in Example 1, 300 g of the powdery quartz was charged in a carbon crucible and then 900 g of the powdery mixture was charged on the powdery quartz. The charged powdery quartz and the charged powdery mixture had a packing density of 1.4 g/cm$^3$. The charged raw materials were heated and then cooled by the same procedure as that in Example 1 to obtain a columnar opaque silica glass article composed of an opaque portion 15 and a transparent portion 16 firmly bonded to the opaque portion 15, as illustrated in FIG. 14 and FIG. 15.

EXAMPLE 4

The procedures described in Example 1 were repeated to obtain a columnar opaque silica glass article composed of an opaque portion 15 and a transparent portion 16 firmly bonded to the opaque portion 15, as illustrated in FIG. 14 and FIG. 15, wherein the crucible charged with the powdery quartz and the mixed powder was maintained at 1,850° C. instead of 1,800° C. in the electric furnace with all other conditions remaining the same. The charged powdery quartz and the charged mixed powder had a packing density of 1.4 g/cm$^3$ as measured before the charged powdery quartz and the charged mixed powder were heated to 1,850° C.

EXAMPLE 5

The procedures described in Example 1 were repeated to obtain a columnar opaque silica glass article composed of an opaque portion 15 and a transparent portion 16 firmly bonded to the opaque portion 15, as illustrated in FIG. 14 and FIG. 15, wherein, after the crucible charged with the powdery quartz and the mixed powder was maintained at 1,800° C. for 10 minutes in the electric furnace, a nitrogen gas was introduced into the electric furnace until the inner pressure reached 2.0 kgf/cm$^2$ and the heating was ceased. All other conditions remained the same. The charged powdery quartz and the charged mixed powder had a packing density of 1.4 g/cm$^3$ as measured before the charged powdery quartz and the charged mixed powder were heated to 1,800° C.

EXAMPLE 6

Powdery amorphous silica having an average particle diameter of 300 μm and a particle diameter distribution in the range of 50 to 1,000 μm was prepared by a process wherein sodium silicate was reacted with an acid and then the reaction product was heated. The powdery amorphous silica was pulverized by using a dry ball mill and further sieved to obtain powdery amorphous silica having an average particle diameter of 180 μm and a particle diameter distribution in the range of 10 to 600 μm. A powdery amorphous silica/silicon nitride mixture was prepared by the same procedure as that employed in Example 1, from 100 parts by weight of the powdery amorphous silica and 0.01 part by weight of the same powdery silicon nitride as that used in Example 1 as follows. Namely, 300 g of the powdery amorphous silica as a raw material for forming the transparent portion was charged in the same carbon crucible as that used in Example 1, and 900 g of the powdery amorphous silica/silicon nitride mixture as a raw material for forming the opaque portion was placed on the charged powdery amorphous silica. The charged powdery amorphous silica and the charged amorphous silica/silicon nitride mixture had a packing density of 0.81 g/cm$^3$. The charged materials were heated and then cooled under the same conditions as those employed in Example 1 to obtain a columnar opaque silica glass article composed of an opaque portion 15 and a transparent portion 16 firmly bonded to the opaque portion 15, as illustrated in FIG. 14 and FIG. 15.

EXAMPLE 7

Powdery amorphous silica having the same average particle diameter and particle diameter distribution as those mentioned in Example 6 was prepared by a process wherein a silicon alkoxide was reacted with water and then the reaction product was heated. The powdery amorphous silica was pulverized by using a dry ball mill and further sieved to obtain a powdery amorphous silica having an average particle diameter of 180 μm and a particle diameter distribution in the range of 10 to 600 μm. A powdery amorphous silica/silicon nitride mixture was prepared by the same procedure as that employed in Example 1, from 100 parts by weight of the powdery amorphous silica and 0.01 part by weight of the same powdery silicon nitride as that used in Example 1 as follows. Namely, 300 g of the powdery amorphous silica as a raw material for forming the transparent portion was charged in the same carbon crucible as that used in Example 1, and 900 g of the powdery amorphous silica/silicon nitride mixture as a raw material for forming the opaque portion was placed on the charged powdery amorphous silica. The charged powdery amorphous silica and the charged amorphous silica/silicon nitride mixture had a packing density of 0.81 g/cm$^3$. The charged materials were heated and then cooled under the same conditions as those employed in Example 1 to obtain a columnar opaque silica glass article composed of an opaque portion and a transparent portion firmly bonded to the opaque portion.

The X ray diffraction analysis of the opaque silica glass articles made in Examples 1 to 7 revealed that the opaque portion and the transparent portion of each of the opaque silica glass articles were in glass state.

The properties of the opaque silica glass articles made in Examples 1 to 7 were evaluated. Namely, the apparent density, average bubble diameter and bubble amount of the opaque portion of each glass article are shown in Table 1.

The total cross-sectional area of bubbles and light transmittance of the opaque portion of each glass article are shown in Table 2. The apparent density, amount of bubbles with a diameter of at least 100 μm, and light transmittance of the transparent portion are shown in Table 3.

TABLE 1

| Example No. | Apparent density (g/cm$^3$) | Average bubble diameter (μm) | Number of bubbles per cm$^3$ |
|---|---|---|---|
| 1 | 2.01 | 74 | 4 × 10$^5$ |
| 2 | 1.82 | 88 | 5 × 10$^5$ |
| 3 | 2.10 | 34 | 2 × 10$^5$ |
| 4 | 1.86 | 90 | 4 × 10$^5$ |
| 5 | 1.97 | 63 | 8 × 10$^5$ |
| 6 | 1.96 | 63 | 8 × 10$^5$ |
| 7 | 2.05 | 66 | 5 × 10$^5$ |
| 8 | 2.01 | 74 | 4 × 10$^5$ |

TABLE 2

| Example No. | Total cross-sectional area of bubbles (cm$^2$/cm$^3$) | Light transmittance (%) | | | |
|---|---|---|---|---|---|
| | | 300 nm | 500 nm | 700 nm | 900 nm |
| 1 | 18 | 0.7 | 1.3 | 2.0 | 2.7 |
| 2 | 30 | 0.2 | 0.4 | 0.5 | 0.6 |
| 3 | 20 | 0.5 | 1.0 | 1.6 | 2.0 |
| 4 | 26 | 0.3 | 0.5 | 0.6 | 0.8 |
| 5 | 25 | 0.4 | 0.7 | 1.0 | 1.4 |
| 6 | 26 | 0.2 | 0.3 | 0.4 | 0.4 |
| 7 | 16 | 0.8 | 1.4 | 2.3 | 2.9 |
| 8 | 18 | 0.7 | 1.3 | 2.0 | 2.7 |

TABLE 3

| Example No. | Apparent density (g/cmhu 3) | Number of bubbles per cm³ | Light transmittance (%) | | | |
|---|---|---|---|---|---|---|
| | | | 300 nm | 500 nm | 700 nm | 900 nm |
| 1 | 2.20 | 50 | 92 | 95 | 95 | 95 |
| 2 | 2.20 | 50 | 92 | 95 | 95 | 95 |
| 3 | 2.20 | 50 | 92 | 95 | 95 | 95 |
| 4 | 2.20 | 50 | 92 | 95 | 95 | 95 |
| 5 | 2.20 | 50 | 92 | 95 | 95 | 95 |
| 6 | 2.20 | 50 | 92 | 95 | 95 | 95 |
| 7 | 2.20 | 50 | 92 | 95 | 95 | 95 |
| 8 | 2.20 | 50 | 92 | 95 | 95 | 95 |

COMPARATIVE EXAMPLE 1

The same powdery quartz as that used in Example 1 was pulverized by using a dry ball mill, and further dispersed in ethanol to be sedimented. Thus, a powdery quartz having an average particle diameter of 5 $\mu$m and a particle diameter distribution in the range of 1 to 10 $\mu$m was obtained depending upon the difference in sedimentation rate. A powdery silica/silicon nitride mixture was prepared from the thus-prepared powdery silica and the same silicon nitride powder as that used in Example 1 by the same procedure as described in Example 1. By substantially the same procedure as that employed in Example 1, 300 g of the powdery quartz was charged in a carbon crucible and then 900 g of the powdery silica/silicon nitride mixture was charged on the powdery quartz. The charged powdery quartz and the charged powdery mixture had a packing density of 0.90 g/cm³. The charged raw materials were heated and then cooled by the same procedure as that in Example 1 to obtain a columnar opaque silica glass article composed of an opaque portion and a transparent portion firmly bonded to the opaque portion.

The X ray diffraction analysis of the columnar opaque silica glass article revealed that both the opaque portion and transparent portion thereof were in glass state. However, the opaque portion had a low apparent density, i.e., 1.2 g/cm³, and, when the glass article was cut and the cross-section was visually examined, the glass particle proved to have pores having a diameter of about 2 to 5 mm. The transparent portion also has a low apparent density, i.e., 2.15 g/cm³, and proved to have pores having a diameter of about 2 mm.

COMPARATIVE EXAMPLE 2

The procedures described in Example 1 were repeated to obtain a columnar opaque silica glass article composed of an opaque portion 15 and a transparent portion 16 firmly bonded to the opaque portion 15, as illustrated in FIG. 14 and FIG. 15, wherein the crucible charged with the powdery quartz and the mixed powder was maintained at 1,950° C. instead of 1,800° C. and the inner pressure of the electric furnace was changed to 1.0 kg/cm² with all other conditions remaining the same. The charged powdery quartz and the charged mixed powder had a packing density of 1.4 g/cm³ as measured before the charged powdery quartz and the charged mixed powder were heated to 1,950° C.

The X ray diffraction analysis of the columnar opaque silica glass article revealed that both the opaque portion and transparent portion thereof were in glass state. However, the opaque portion has a low apparent density, i.e., 1.5 g/cm³. The average bubble diameter was 200 $\mu$m, and the opaque silica glass article was very brittle.

EXAMPLE 8

A powdery quartz/silicon nitride mixture was prepared by the same procedure as mentioned in Example 1 wherein the amount of the powdery silicon nitride was changed to 0.03 part by weight based on 100 parts by weight of the powdery quartz with all other conditions remaining the same.

Figure 16:
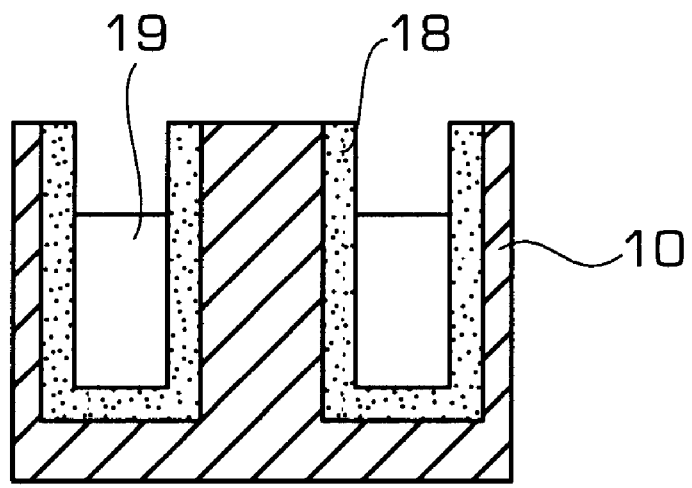
FIG. 16 is a cross-sectional view of a heat-resistant mold charged with a raw material for forming a ring-form transparent silica glass article.

As illustrated in FIG. 16, 5 kg of the same powdery quartz 19 as that used in Example 1 was charged in a carbon mold 10 with a ring-form cavity having an outer diameter of 440 mm, an inner diameter of 270 mm and a depth of 100 mm and having a carbon felt 18 with a thickness of 5 mm adhered on the inner wall of the mold. The state of the charged powdery quartz 19 was illustrated in FIG. 16. The mold was placed in an electric furnace and the inner atmosphere was vacuumed to a pressure of $1 \times 10^{-3}$ mmHg. Then the temperature was elevated from room temperature to 1,800° C. at a rate of 300° C./hour. The mold was maintained at 1,800° C. for 10 minutes, and then, the power switch of the electric furnace was turned out and the mold was allowed to stand. The inner temperature of the electric furnace reached 1,000° C. about 50 minutes later, and gradually fell to room temperature. The thus-prepared transparent ring-form silica glass article was cut to obtain specimens, and their properties were evaluated. The apparent density, amount of bubbles with a diameter of at least 100 $\mu$m, and a light transmittance as irradiated with light of wavelength of 300 to 900 nm of the specimens were 2.20 g/cm³, 50 bubbles per cm³, and 92 to 95%, respectively. The transparent ring-form silica glass article was machined to obtain a transparent ring-form silica glass article having an outer diameter of 400 mm, an inner diameter of 270 mm and a thickness (height) of 10 mm, used as a raw material for forming the transparent portion.

Figure 17:
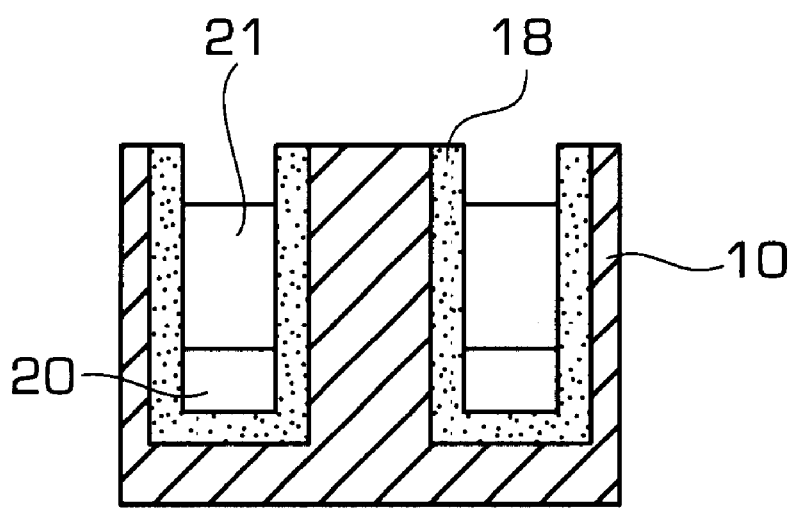
FIG. 17 is a cross-sectional view of a heat-resistant mold charged with a ring-form transparent silica glass article and a powdery raw material for forming an opaque portion of a silica glass article.

As illustrated in FIG. 17, the above-mentioned transparent ring-form silica glass article 20 for forming the transparent portion was placed on the bottom of the same mold 10 as the above-mentioned carbon mold, which had a carbon felt 18 adhered on the inner wall thereof, and 5 kg of the above-mentioned powdery silica/silicon nitride mixture 21 was charged on the transparent ring-form silica glass article 20. The charged powdery silica/silicon nitride mixture 21 had a packing density of 1.4 g/cm³.

The raw materials-charged mold was placed in an electrical furnace, and the inner atmosphere of the furnace was vacuumed to a pressure of $1 \times 10^{-3}$ mmHg. Then the temperature was elevated from room temperature to 1,800° C. at a rate of 300° C./hour. The mold was maintained at 1,800° C. for 10 minutes, and then, a nitrogen gas was introduced into the electric furnace until the inner pressure reached normal pressure (1 kgf/cm²) and the heating was ceased. Thereafter the power switch of the electric furnace was turned out and the crucible was allowed to stand. The inner temperature of the electric furnace reached 1,000° C. about 50 minutes later, and gradually fell to room temperature.

Figure 18:
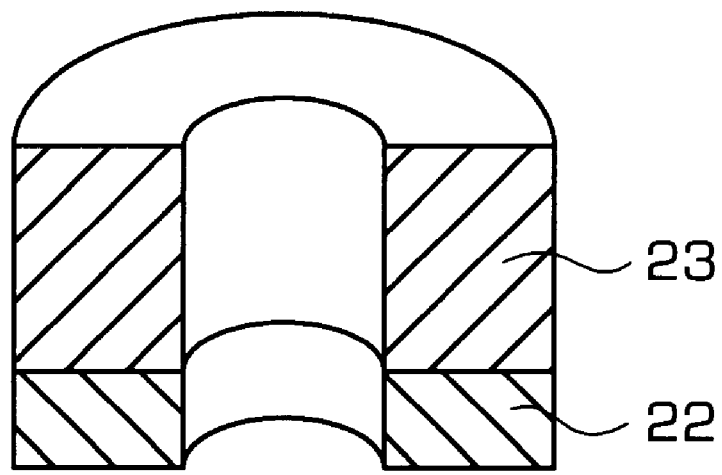
FIG. 18 is a perspective view of an opaque silica glass article made by using the mold illustrated in FIG. 17, which article is cut along a central vertical plane.

As illustrated in FIG. 18, the thus-made glass article was a ring-form opaque silica glass article having a structure composed of an opaque ring-form portion 23 and a transparent ring-form portion 22 firmly bonded to the opaque portion 23.

The X ray diffraction analysis of the opaque ring-form silica glass article revealed that the opaque portion and the transparent portion were in glass state. The properties of the opaque ring-form silica glass article. Namely, the apparent density, average bubble diameter and the bubble amount of the opaque portion of glass article are shown in Table 1. The total cross-sectional area of bubbles and light transmittance of the opaque portion of glass article are shown in Table 2. The apparent density, amount of bubbles with a diameter of at least 100 μm and light transmittance of the transparent portion are shown in Table 3.

COMPARATIVE EXAMPLE 3

By the same procedures as employed in Example 8, a powdery quartz/silicon nitride mixture as a raw material for forming the opaque portion of the opaque silica glass article was prepared wherein powdery quartz having an average particle diameter of 700 μm and a particle diameter distribution in the range of 500 to 1,000 μm was used with all other conditions remaining the same, and further, a transparent ring-form silica glass article as a raw material for forming the transparent portion of the opaque silica glass article was prepared.

Figure 19:
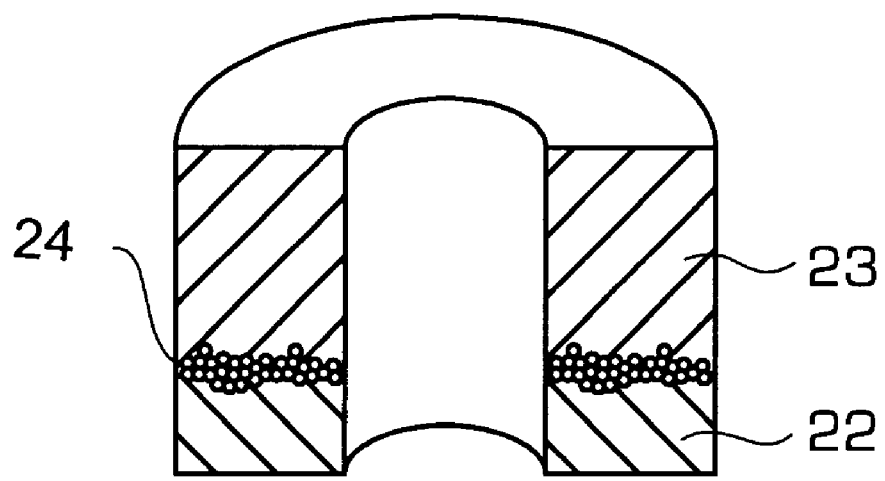
FIG. 19 is a perspective view of an opaque silica glass article made by using the mold illustrated in FIG. 17, which is a comparative article and is cut along a central vertical plane.

The transparent ring-form silica glass article was placed on the bottom of the same carbon mold as used in Example 8, and 5 kg of the powdery quartz/silicon nitride mixture was charged on the transparent ring-form silica glass article. The charged transparent ring-form silica glass article had a packing density of 0.78 g/cm$^3$. The raw materials-charged mold was placed in an electric furnace, and heated and cooled under the same conditions as employed in Example 8 to obtain an opaque ring-form silica glass article having a structure composed of an opaque portion 23 and a transparent portion 22 firmly bonded to the opaque portion 23, as illustrated in FIG. 19.

The X ray diffraction analysis of the opaque ring-form silica glass article revealed that the opaque portion 23 and the transparent portion 22 were in glass state. However, the opaque portion 23 has a low apparent density, i.e., 1.4 g/cm$^3$, and, when the glass article was cut and the cross-section was visually examined, the glass article proved to have pores having a diameter of about 0.5 to 1 mm. The transparent portion 22 also has a low apparent density, i.e., 2.17 g/cm$^3$, and proved to have pores having a diameter of about 1 mm.

The same powdery quartz/silicon nitride mixture and the same transparent ring-form silica glass article as those prepared in Example 8 were prepared. Further as illustrated in FIG. 19, a multiplicity of pores 24 having a diameter of about 2 to 3 mm were present in the boundary between the opaque portion 23 and the transparent portion 22.

COMPARATIVE EXAMPLE 4

The transparent ring-form silica glass article was placed on the bottom of the same carbon mold as used in Example 8, and the powdery quartz/silicon nitride mixture was charged on the transparent ring-form silica glass article. The charged transparent ring-form silica glass article had a packing density of 1.4 g/cm$^3$. The raw materials-charged mold was placed in an electric furnace, and the inner atmosphere was vacuumed to a pressure of $1 \times 10^{-3}$ mmHg. Then a nitrogen gas was introduced into the electric furnace until the inner pressure reached normal pressure (1kgf/cm$^2$), and then, the temperature was elevated from room temperature to 1,800° C. at a rate of 300° C./hour. The mold was maintained at 1,800° C. for 10 minutes, and then, the heating was ceased. Thereafter the power switch of the electric furnace was turned out and the mold was allowed to stand. The inner temperature of the electric furnace reached 1,000° C. about 50 minutes later, and gradually fell to room temperature.

As illustrated in FIG. 19, the thus-made glass article was a ring-form opaque silica glass article having a structure composed of an opaque portion 23 and a transparent portion 22 firmly bonded to the opaque portion 23.

The X ray diffraction analysis of the opaque ring-form silica glass article revealed that the opaque portion 23 and the transparent portion 22 were in glass state. However, the opaque portion 23 has a low apparent density, i.e., 1.2 g/cm$^3$, and when the glass article was cut and the cross-section was visually examined, it was found that bubbles were distributed non-uniformly in the glass article, i.e., the amount of bubbles was increased radially outwardly toward the surface portion. Further, as illustrated in FIG. 19, a multiplicity of pores 24 having a diameter of about 2 to 3 mm were present in the boundary between the opaque portion 23 and the transparent portion 22.

COMPARATIVE EXAMPLE 5

By the same procedures as employed in Comparative Example 4, an opaque ring-form silica glass article having an opaque portion and a transparent portion was made wherein the powdery silicon nitride was not used as the raw material for forming the opaque portion with all other conditions remaining the same. The powdery quartz charged within the mold as the raw material for forming the opaque portion had an apparent density of 1.4 g/cm$^3$.

As illustrated in FIG. 19, the X ray diffraction analysis of the opaque ring-form silica glass article revealed that the opaque portion 23 and the transparent portion 22 were in glass state. However, the opaque portion 23 has a low apparent density, i.e., 1.5 g/cm$^3$, and when the glass article was cut and the cross-section was visually examined, it was found that i.e., the amount of bubbles was increased radially outwardly toward the surface portion. Further, as illustrated in FIG. 19, a multiplicity of pores 24 having a diameter of about 2 to 3 mm were present in the boundary between the opaque portion 23 and the transparent portion 22.

The advantages of the opaque silica glass article of the invention and the process for producing the same of the invention are summarized as follows.

(1) The opaque portion of the opaque silica glass article is composed of powdery silica having uniformly dispersed therein a predetermined amount of a powdery silicon nitride. The amount and diameter of bubbles, and apparent density of the silica glass article are controlled by the amount of the powdery silicon nitride, the particle diameter of the powdery silica and the melting temperature, and thus, the opaque silica article exhibiting excellent heat insulating property can be obtained.

(2) The bubbles are formed in the molten material by vitrification of powdery silica and decomposition of powdery silicon nitride, and thus, impurities such as alkali metals are not incorporated in the glass article. Further, when the raw material is melted, a hydroxyl group is not entrapped therein, but is volatilized therefrom. Therefore, the content of a hydroxyl group is minimized and the undesirable reduction of viscosity at a high temperature of the silica glass article can be avoided.

Further, even when a transparent shaped silica glass article is used as a raw material for forming the transparent portion of the opaque silica glass article, the resulting opaque silica glass article has good resistance to distortion.

(3) Bubbles are not formed or formed only to a negligible extent at the boundary between the opaque portion and the transparent portion, and therefore, these two portions are firmly bonded together. When the silica glass article is cleaned, the surface portion is not readily cut out. The glass article has a smooth surface, and the surface exhibits a good sealability. Therefore, the silica glass article is especially useful as a flange member attached to a furnace tube for heating wafers.

(4) The opaque silica glass article can be made by a heat-resistant mold of any desired shape, and thus, it can be of a desired shape such as flange-shape, ring-form, column, square pillar and hollow square pillar, or any other complicated shape. The shaping is not complicated.

The distortion in the production process is very minor, and a silica glass article having the finally intended size and shape can be obtained. An after-treatment such as machine finishing can be omitted or minimized.

(5) The powdery raw material for forming the opaque portion is capable of being melted at a relatively low temperature, and thus, when a transparent silica glass article is used as a raw material for forming the transparent portion, the opaque silica glass article can be made without substantial melting of the transparent silica glass article.

What is claimed is:

1. An opaque silica glass article comprising a transparent portion and an opaque portion, wherein the glass of the opaque portion has an apparent density of 1.70 to 2.15 g/cm$^3$ and contains $5 \times 10^4$ to $5 \times 10^6$ bubbles per cm$^3$ of the glass, said bubbles having an average bubble diameter of 10 to 100 µm; and the glass of the transparent portion consists essentially of silica, and has an apparent density of 2.19 to 2.21 g/cm$^3$ and the amount of bubbles having a diameter of at least 100 µm in the transparent portion is not more than $1 \times 10^3$ per cm$^3$ of the glass, said transparent portion being exposed on at least part of the surface of the opaque silica glass article and forming a surface layer of the opaque silica glass article which is firmly bonded to the opaque portion of the silica glass article as a substrate and said transparent portion of the opaque silica glass article having a surface smoothness sufficient to form a sealing surface between the opaque glass article and another object in contact with the opaque glass article.

2. The opaque silica glass article according to claim 1, wherein the linear transparency, as measured by irradiating the glass article with light having a wavelength of 300 to 900 nm and as expressed as the value at a thickness of 1 mm, of the opaque portion is not larger than 5% and that of the transparent portion is at least 90%.

3. The opaque silica glass article according to claim 1, wherein the shape of the opaque silica glass article is flange-form, ring-shaped, columnar, square pillar or hollow-square pillar.

* * * * *